US010169633B2

(12) United States Patent
Mo et al.

(10) Patent No.: US 10,169,633 B2
(45) Date of Patent: Jan. 1, 2019

(54) DRIVING CIRCUIT, DRIVING METHOD, DISPLAY APPARATUS AND ELECTRONIC APPARATUS (71) Applicant: FocalTech Systems, Inc., George Town, Grand Cayman (KY)

(72) Inventors: Lianghua Mo, Guangdong (CN); Jie Liu, Guangdong (CN)

(73) Assignee: FOCALTECH ELECTRONICS, LTD., Focaltech Electronics (KY)

( * ) Notice: Subject to any disclaimer, the term of this patent is extended or adjusted under 35 U.S.C. 154(b) by 91 days.

(21) Appl. No.: 14/582,547

(22) Filed: Dec. 24, 2014

(65) Prior Publication Data
US 2016/0026843 A1    Jan. 28, 2016

(30) Foreign Application Priority Data
Jul. 23, 2014   (CN) .......................... 2014 1 0354448

(51) Int. Cl.
G06F 3/041     (2006.01)
G06K 9/00      (2006.01)

(52) U.S. Cl.
CPC ........... *G06K 9/0002* (2013.01); *G06F 3/041* (2013.01); *G06K 9/00087* (2013.01)

(58) Field of Classification Search
CPC ..... G06F 3/041; G06K 9/0002; G06K 9/0008
See application file for complete search history.

(56) References Cited

U.S. PATENT DOCUMENTS 6,941,001 B1    9/2005   Bolle et al.
2003/0016847 A1* 1/2003  Quintana ........... G07C 9/00563
                                            382/124
(Continued)

FOREIGN PATENT DOCUMENTS

CN    1694302      11/2005
CN    101615229    12/2009
(Continued)

OTHER PUBLICATIONS

104100869, Oct. 12, 2015, Taiwanese Office Action and Partial English Translation.
201410354448.3, May 4, 2018, Chinese Office Action.

*Primary Examiner* — Chun-Nan Lin
(74) *Attorney, Agent, or Firm* — Workman Nydegger (57) ABSTRACT An electronic device with a fingerprint sensing function and a method for calling an application are provided. The electronic device includes a fingerprint sensing region, a fingerprint sensing module and a control module. The fingerprint sensing module is configured to sense fingerprint input information input in the fingerprint sensing region. The control module is configured to recognize current state of the electronic device, provide a first driving signal to the fingerprint sensing module if the electronic device is in one of N preset states, to drive the fingerprint sensing module to sense fingerprint, receive fingerprint input information fed back by the fingerprint sensing module, judge whether the fingerprint input information is valid, and determine whether to call a corresponding application based on judgment result, where N is a positive integer. Response speed of the provided electronic device in calling applications is fast and high safety is ensured.

22 Claims, 4 Drawing Sheets

(56) References Cited

U.S. PATENT DOCUMENTS

| | | | |
|---|---|---|---|
| 2004/0096086 A1* | 5/2004 | Miyasaka | G06F 3/03547 382/124 |
| 2004/0258283 A1* | 12/2004 | Ikeda | G06K 9/00013 382/124 |
| 2009/0027351 A1* | 1/2009 | Zhang | H01P 5/107 345/173 |
| 2009/0315675 A1* | 12/2009 | Yokota | G06F 21/32 340/5.83 |
| 2010/0066954 A1 | 3/2010 | Wang et al. | |
| 2010/0220900 A1* | 9/2010 | Orsley | G06F 3/0421 382/124 |
| 2010/0267424 A1* | 10/2010 | Kim | G06F 3/016 455/566 |
| 2012/0090757 A1 | 4/2012 | Buchan et al. | |
| 2012/0174213 A1 | 7/2012 | Geiger et al. | |
| 2013/0129162 A1* | 5/2013 | Cheng | G06F 21/32 382/124 |
| 2013/0234825 A1* | 9/2013 | Malhotra | A61B 5/1172 340/5.53 |
| 2014/0047706 A1 | 2/2014 | Shaikh et al. | |
| 2014/0106711 A1* | 4/2014 | Seo | H04L 63/0861 455/411 |
| 2015/0043791 A1* | 2/2015 | Setlak | G06K 9/0002 382/124 |
| 2015/0177884 A1* | 6/2015 | Han | G06F 3/044 345/174 |

FOREIGN PATENT DOCUMENTS

| | | |
|---|---|---|
| CN | 204270305 | 4/2015 |
| TW | 201229852 | 7/2012 |
| TW | 201234277 | 8/2012 |
| TW | 201234282 | 8/2012 |
| TW | 201322142 | 6/2013 |
| TW | M505013 | 7/2015 |

* cited by examiner

DRIVING CIRCUIT, DRIVING METHOD, DISPLAY APPARATUS AND ELECTRONIC APPARATUS

CROSS REFERENCES OF RELATED APPLICATION

The present application claims the priority to Chinese Patent Application No. 201410354448.3, entitled "ELECTRONIC DEVICE WITH FINGERPRINT SENSING FUNCTION AND METHOD FOR CALLING APPLICATION", filed on Jul. 23, 2014 with the State Intellectual Property Office of People's Republic of China, which is incorporated herein by reference in its entirety.

FIELD

The disclosure relates to fingerprint detection technology, and in particular to an electronic device with a fingerprint sensing function and a method for calling an application in the electronic device.

BACKGROUND

With the development of the electronic technology, the touch panel instead of the physical keyboard is extensively used in electronic devices, and accordingly, the user operation is more convenient. To call a target application in a conventional electronic device, it is necessary to access a main page of the electronic device first and then touch an icon of the target application, and consequently, the response speed is slow. Since the electronic device in a sleep state (such as a screen-locked state or a standby state) can not sense any touch action on the touch panel, it is necessary to waken the electronic device in advance to call the target application. The corresponding application runs after the electronic device is unlocked, and accordingly, the response speed is slow.

SUMMARY

To solve the above-mentioned technical problem, an electronic device with a fingerprint sensing function and a method for calling an application in the electronic device are provided according to embodiments of the disclosure, to improve the response speed of the electronic device in calling applications.

Technical solutions according to the embodiments of the disclosure are described as follows.

An electronic device with a fingerprint sensing function is provided. The electronic device includes a fingerprint sensing region, a fingerprint sensing module and a control module.

The fingerprint sensing module is configured to sense fingerprint input information input by an object in the fingerprint sensing region.

The control module is configured to, recognize a current state of the electronic device, provide a first driving signal to the fingerprint sensing module in the case that the electronic device is in one of N preset states, to drive the fingerprint sensing module to sense a fingerprint, receive the fingerprint input information fed back by the fingerprint sensing module, judge whether the fingerprint input information is valid, and determine, based on a judgment result, whether to call a corresponding application, where N is a positive integer not less than 1.

A method for calling an application in an electronic device with a fingerprint sensing function is provided. The electronic device includes a fingerprint sensing region. The method includes:

recognizing a current state of the electronic device, sensing fingerprint input information input by an object in the fingerprint sensing region, in the case that the electronic device is in one of N preset states, and judging whether the fingerprint input information is valid and determining, based on a judgment result, whether to call a corresponding application, where N is a positive integer not less than 1.

The electronic device with the fingerprint sensing function provided in the disclosure includes the fingerprint sensing region, the fingerprint sensing module and the control module. The fingerprint sensing module is configured to sense fingerprint input information input by an object in the fingerprint sensing region. The control module is configured to recognize the current state of the electronic device, provide a first driving signal to the fingerprint sensing module in the case that the electronic device is in one of N preset states, to drive the fingerprint sensing module to sense a fingerprint, receive the fingerprint input information fed back by the fingerprint sensing module, judge whether the fingerprint input information is valid, and determine whether to call the corresponding application based on a judgment result, where the N is a positive integer which is not less than 1.

In view of the above, with the electronic device with the fingerprint sensing function provided in the disclosure, for calling an application, corresponding valid fingerprint information may be input in the fingerprint sensing region if the electronic device is in one of the N preset states, and the application may be called based on the corresponding valid fingerprint information. It is not necessary to waken and unlock the electronic device, or to access a main page of the electronic device and touch an icon corresponding to the application. Therefore, the response speed of the electronic device in calling the application is enhanced.

In addition, with the electronic device with the fingerprint sensing function provided in the disclosure, when calling the application by using the fingerprint information, the application is called only if the input fingerprint information is valid, while the application is not called if the input fingerprint information is invalid. Therefore, the safety of the electronic device is improved.

BRIEF DESCRIPTION OF THE DRAWINGS

In order to illustrate technical solutions according to embodiments of the disclosure more clearly, drawings to be used in description of the embodiments of the disclosure are described briefly hereinafter. Apparently, the drawings described hereinafter are only for illustrating some embodiments of the present disclosure, and other drawings may be obtained by those skilled in the art based on those drawings without creative effort.

DETAILED DESCRIPTION OF THE EMBODIMENTS

As set forth in background, it is necessary to waken an electronic device in a sleep state in advance to call one application in the electronic device, and the application may run only after the electronic device is unlocked. Therefore, the response speed is slow.

In view of the above, an electronic device with a fingerprint sensing function is provided according to an embodiment of the disclosure. The electronic device includes: a fingerprint sensing region, a fingerprint sensing module and a control module.

The fingerprint sensing module is configured to sense fingerprint input information input by an object in the fingerprint sensing region. The object may be a finger, for example.

The control module is configured to recognize a current state of the electronic device. In the case that the electronic device is in one of N preset states, the control unit provides a first driving signal to the fingerprint sensing module to drive the fingerprint sensing module to sense a fingerprint and receives the fingerprint input information fed back by the fingerprint sensing module. The control unit further judges whether the fingerprint input information is valid, and determines, based on a judgment result, whether to call a corresponding application. Here, N is a positive integer not less than 1.

Correspondingly, a method for calling an application in an electronic device with a fingerprint sensing function is provided according to an embodiment of the disclosure. The electronic device includes a fingerprint sensing region.

The method includes:
recognizing a current state of the electronic device;
sensing fingerprint input information input by an object in the fingerprint sensing region, in the case that the electronic device is in one of N preset states, where N is a positive integer not less than 1;
judging whether the fingerprint input information is valid; and
determining, based on a judgment result, whether to call a corresponding application.

It can be seen from the above description that, for calling an application, corresponding valid fingerprint information may be input in the fingerprint sensing region if the electronic device is in one of the N preset states, and the application may be called based on the corresponding valid fingerprint information. It is unnecessary to waken and unlock the electronic device, or to access a main page of the electronic device and touch an icon corresponding to the application. Therefore, the response speed of the electronic device in calling the application is enhanced.

In addition, with the electronic device with the fingerprint sensing function and the method for calling the application in the electronic device provided in the disclosure, when calling the application by using the fingerprint information, the application is called only if the input fingerprint information is valid, while the application is not called if the input fingerprint information is invalid. Therefore, the safety of the electronic device is improved.

To make the above objects, features and advantages of the disclosure more apparent and easier to be understood, in the following, particular embodiments of the disclosure are illustrated in detail in conjunction with the accompanying drawings.

Specific details are set forth in the following descriptions for sufficient understanding of the disclosure. However, the disclosure can also be implemented by other ways different from the way described herein, and similar extensions can be made by those skilled in the art without departing from the spirit of the disclosure. Therefore, the disclosure is not limited to the particular embodiments disclosed hereinafter.

Figure 1:
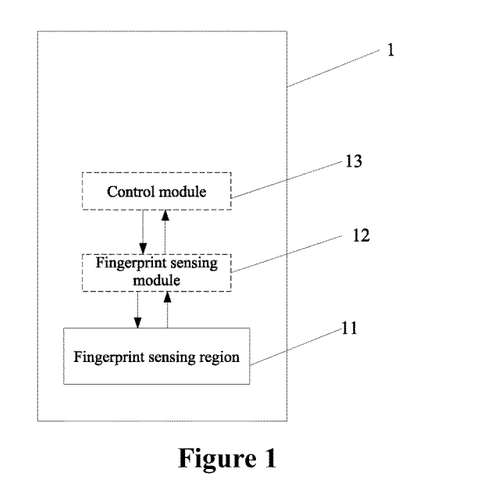
FIG. 1 is a schematic structural diagram of an electronic device according to an embodiment of the disclosure.

An electronic device with a fingerprint sensing function is provided according to an embodiment of the disclosure. As shown in FIG. 1, the electronic device 1 includes: a fingerprint sensing region 11, a fingerprint sensing module 12 and a control module 13. The fingerprint sensing module 12 is configured to sense fingerprint input information input by an object in the fingerprint sensing region 11. The control module 13 is configured to, recognize a current state of the electronic device 1, provide, in the case that the electronic device 1 is in one of N preset states, a first driving signal to the fingerprint sensing module 12 to drive the fingerprint sensing module 12 to sense a fingerprint, receive the fingerprint input information fed back by the fingerprint sensing module 12, judge whether the fingerprint input information is valid, and determine, based on a judgment result, whether to call a corresponding application. Here, N is a positive integer not less than 1. The object may be, a finger, for example.

The fingerprint input information is judged as valid in the case that the fingerprint input information received by the control module 13 matches fingerprint information pre-stored in the control module 13, or the fingerprint input information is judged as invalid in the case that the fingerprint input information received by the control module 13 does not match the fingerprint information pre-stored in the control module 13. The application runs in a user mode, and interactions between the application and a user are available in the user mode. The application has a visible user interface, for example, the application may be a browser, a micro-blog, an e-reading application, a player, a game, a texting application, a keyboard and a contact list, etc.

It should be noted that, in the embodiment of the disclosure, the N preset states include but are not limited to a screen-locked state and a standby state. The N preset states may include other states in other embodiments of the disclosure.

In an embodiment of the disclosure, the control module 13 does not provide the first driving signal to the fingerprint sensing module 12 in the case that the current state of the electronic device 1 is not any one of the N preset states. Accordingly, the fingerprint sensing module 12 does not operate.

In an embodiment of the disclosure, each application may be called by using one corresponding piece of valid fingerprint input information. In the case that the current state of the electronic device 1 is one of the N preset states, the control module 13 judges whether the fingerprint input information fed back currently by the fingerprint sensing module 12 is valid, and determines based on a judgment result whether to call a corresponding application. In the embodiment, the process of determining based on the judgment result whether to call the corresponding application includes: calling the corresponding application if the control module 13 judges that the fingerprint input information fed back currently by the fingerprint sensing module 12 is valid, or not calling the corresponding application, i.e., not responding to the current fingerprint input information by the control module 13 if the control module 13 judges that the fingerprint input information fed back currently by the fingerprint sensing module 12 is invalid. In other words, in the embodiment, the corresponding application is called only if the electronic device 1 is in one of the N preset states and the control module 13 judges that the fingerprint input information fed back currently by the fingerprint sensing module 12 is valid.

According to an embodiment of the disclosure, different pieces of valid fingerprint input information input in a same fingerprint sensing region 11 correspond to different applications. According to another embodiment of the disclosure, different fingerprint sensing regions 11 correspond to different applications. It should be noted that, a same piece of valid fingerprint input information input in different fingerprint sensing regions 11 may correspond to different applications; or different pieces of valid fingerprint input information respectively input in different fingerprint sensing regions 11 correspond to different applications. In other words, according to embodiments of the disclosure, each application corresponds to a certain piece of valid fingerprint input information input in a certain fingerprint sensing region.

In an embodiment of the disclosure, one application is called by using at least two pieces of valid fingerprint input information. In the embodiment, the control module 13 calls a corresponding application in the case that at least two pieces of fingerprint input information successively input in one fingerprint sensing region 11 each is predetermined valid fingerprint input information.

In a particular embodiment of the disclosure, one application is called by using two pieces of valid fingerprint input information. It should be noted that in one case of the embodiment, for two permutations each including two pieces of valid fingerprint input information which are successively input, if the pieces of valid fingerprint input information in one permutation differ from those in the other permutation, the two permutations correspond to different applications, and if the pieces of valid fingerprint input information in one permutation and those in the other permutation are identical but an order for inputting the pieces of valid fingerprint input information in one permutation differs from that for inputting the pieces of valid fingerprint input information in the other permutation, the two permutations correspond to different applications. In other words, each application corresponds to a certain permutation of two pieces of valid fingerprint input information. In another case of the embodiment, if the pieces of valid fingerprint input information in one permutation differ from those in another permutation, the two permutations correspond to different applications. If the pieces of valid fingerprint input information in one permutation and those in another permutation are identical, the two permutations correspond to a same application, no matter whether orders for inputting the pieces of valid fingerprint input information in the two permutations are identical or not.

In the electronic device according to other embodiments of the disclosure, one application may be called by using three, four or more pieces of valid fingerprint input information, which is not limited in the disclosure and may be determined by specific circumstances. Similarly, in the case that the pieces of valid fingerprint input information in one permutation and those in another permutation are identical but orders for inputting the pieces of valid fingerprint input information in the two permutations are non-identical, the two permutations may either correspond to a same application or correspond to different applications, which is not limited in the disclosure and may be determined by specific circumstances.

In an embodiment of the disclosure, the electronic device 1 includes a plurality of fingerprint sensing regions 11. The control module 13 calls a corresponding application in the case that pieces of fingerprint input information respectively input in at least two fingerprint sensing regions 11 are valid.

In a particular embodiment of the disclosure, the control module 13 calls the corresponding application in the case that two pieces of fingerprint input information respectively input in two fingerprint sensing regions 11 of the electronic device 1 are both valid. In one case of the embodiment, for two permutations, each including two pieces of valid fingerprint input information which are respectively input in two fingerprint sensing regions, if the pieces of valid fingerprint input information in one permutation and those in the other permutation are identical but the fingerprint sensing regions where one permutation is input and those where the other permutation is put are non-identical, the two permutations correspond to different applications. If the two fingerprint sensing regions where one permutation is input and those where the other permutation is put are identical but the pieces of valid fingerprint input information in one permutation and those in the other permutation are non-identical, the two permutations correspond to different applications. If the two fingerprint sensing regions where one permutation is input and those where the other permutation is put are identical, the pieces of valid fingerprint input information in one permutation and those in the other permutation are identical, but an order for inputting the pieces of valid fingerprint input information in one permutation differs from that for inputting the pieces of valid fingerprint input information in the other permutation, the two permutations correspond to different applications. In another case of the embodiment, if the two fingerprint sensing regions where one permutation is input and those where the other permutation is put are identical, the pieces of valid fingerprint input information in one permutation and those in the other permutation are identical, but an order for inputting the pieces of valid fingerprint input information in one permutation differs from that for inputting the pieces of valid fingerprint input information in the other permutation, the two permutations may correspond to a same application. According to other cases of the embodiment, if the pieces of valid fingerprint input information in one permutation and those in the other permutation are identical but the two fingerprint sensing regions where one permutation is input and those where the other permutation is put are non-identical, the two permutations may correspond to a same application, which is not limited in the disclosure and may be determined based on specific circumstances.

In an embodiment of the disclosure, the control module 13 provides a first driving signal to the fingerprint sensing module 12 in the case that the electronic device 1 is in one of the N preset states, to drive the fingerprint sensing module 12 to sense a fingerprint, receives the fingerprint input information output by the fingerprint sensing module 12, judges whether the fingerprint input information received within a predetermined period of time is valid, and determines, based on a judgment result, whether to call a corresponding application. Specifically, the fingerprint sensing module 12 outputs the corresponding fingerprint input information to the control module 13 upon sensing that there is fingerprint input information input in the fingerprint sensing region 11. The control module 13 judges whether the fingerprint input information received within the predetermined period of time includes valid fingerprint input information and determines, based on the judgment result, whether to call the corresponding application.

In the embodiment, if it is judged that the fingerprint input information received within the predetermined period of time includes valid fingerprint input information, the control module 13 calls the application corresponding to the valid fingerprint input information. If each piece of fingerprint input information received within the predetermined period of time is invalid, the control module 13 does not call any corresponding application. In this way, the probability of a case that the electronic device 1 responds to an unintentional operation performed in the fingerprint sensing region 11 of the electronic device 1 is decreased.

It should be noted that, if the control module 13 receives one piece of valid fingerprint input information within the predetermined period of time, the control module 13 calls an application corresponding to the one piece of valid fingerprint input information. If the control module 13 receives two pieces of valid fingerprint input information within the predetermined period of time, the control module 13 calls an application corresponding to the two pieces of valid fingerprint input information. If the control module 13 receives three pieces of valid fingerprint input information within the predetermined period of time, the control module 13 calls an application corresponding to the three pieces of valid fingerprint input information. Similarly, if the control module 13 receives n pieces of valid fingerprint input information within the predetermined period of time, the control module 13 calls an application corresponding to the n pieces of valid fingerprint input information, here n is a positive integer more than 3. The disclosure is not limited in the aspect and it may be determined by specific circumstances.

Based on any of the above-mentioned embodiments, in the case that the current state of the electronic device 1 is one of the N preset states, the fingerprint sensing module 12 senses whether there is a fingerprint input in the fingerprint sensing region 11 in a real time manner or at a predetermined time interval. The fingerprint sensing module 12 outputs corresponding fingerprint input information to the control module 13 in the case that there is the fingerprint input in the fingerprint sensing region 11. The control module 13 judges whether received fingerprint input information is valid, calls a corresponding application if the received fingerprint input information is valid, or does not call any corresponding application if the received fingerprint input information is invalid. Therefore, the response speed of the electronic device 1 in calling applications is improved.

Figure 2:
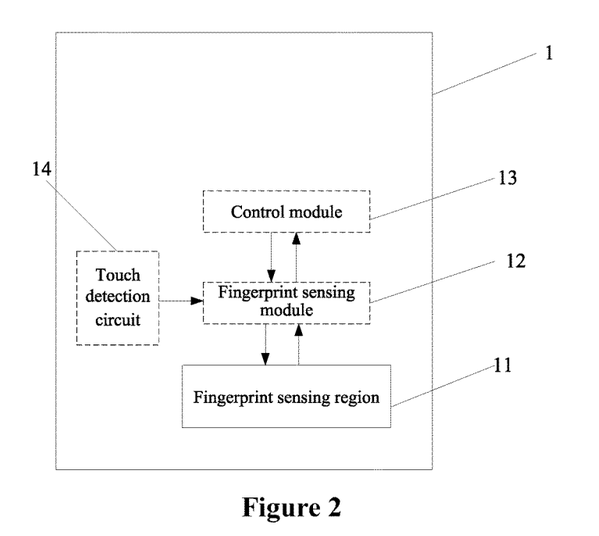
FIG. 2 is a schematic structural diagram of an electronic device according to an embodiment of the disclosure.

In an embodiment of the disclosure, the electronic device 1 further includes a touch module. The touch module includes a touch detection circuit 14 as shown in FIG. 2 and a touch panel (not shown in FIG. 2). The touch detection circuit 14 is configured to detect whether a surface of the touch panel is touched, and provide a second driving signal to the fingerprint sensing module 12 when the touch detection circuit detects that the surface of the touch panel is touched. The fingerprint sensing module 12 receives the second driving signal, and senses the fingerprint input information input by the object in the fingerprint sensing region 11, upon receiving both the first driving signal and the second driving signal.

In the embodiment, the touch detection circuit 14 detects in a real time manner or at a predetermined time interval, to determine whether the surface of the touch panel is touched. The touch detection circuit 14 provides the second driving signal to the fingerprint sensing module 12 if the touch detection circuit detects that the surface of the touch panel is touched, or the touch detection circuit 14 does not provide the second driving signal to the fingerprint sensing module 12 if the touch detection circuit detects that the surface of the touch-control panel is not touched. The fingerprint sensing module 12 senses the fingerprint input information input by the object in the fingerprint sensing region 11 only upon receiving both the first driving signal and the second driving signal. Therefore, the fingerprint sensing module 12 senses the fingerprint input information in the fingerprint sensing region 11 only in the case that the current state of the electronic device 1 is one of the N preset states and the surface of the touch panel is touched, otherwise, the fingerprint sensing module 12 does not sense the fingerprint input information in the fingerprint sensing region 11.

It should be noted that, in the embodiment of the disclosure, the touch panel may be an on-cell touch panel or an in-cell touch panel, which is not limited in the disclosure and may be determined by specific circumstances.

Figure 3:
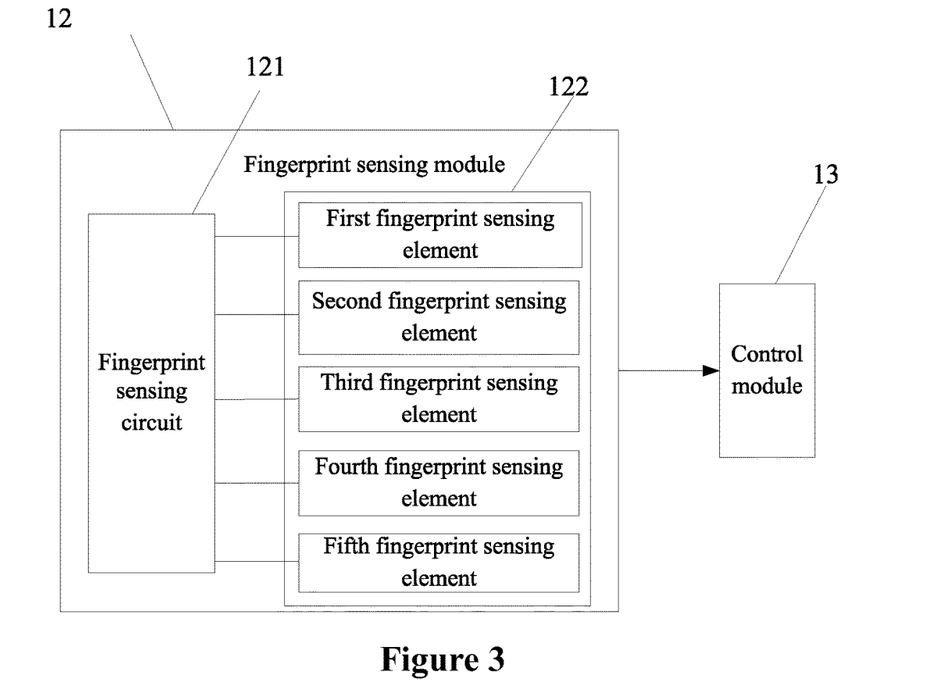
FIG. 3 is a schematic structural diagram of a fingerprint sensing module and a control module of the electronic device shown in FIG. 1.

In an embodiment of the disclosure, as shown in FIG. 3, the fingerprint sensing module 12 includes a fingerprint sensing circuit 121 and at least one fingerprint sensing element 122 corresponding to the fingerprint sensing region 11. The fingerprint sensing region 11 is defined by the location of the at least one fingerprint sensing element 122. The at least one fingerprint sensing element 122 is connected to the fingerprint sensing circuit 121. The fingerprint sensing circuit 121 is configured to, provide a fingerprint sensing signal to the at least one fingerprint sensing element 122 to drive the at least one fingerprint sensing element 122 to perform a fingerprint sensing, and receive a sensing signal output by the at least one fingerprint sensing element 122. The fingerprint sensing circuit 121 judges whether there is fingerprint input information based on the sensing signal, and outputs corresponding fingerprint input information to the control module 13 if it is judged that there is the fingerprint input information.

It should be noted that, in the embodiment of the disclosure, each fingerprint sensing element 122 corresponds to one fingerprint sensing region 11. In an embodiment of the disclosure, there may be five fingerprint sensing elements 122: a first fingerprint sensing element, a second fingerprint sensing element, a third fingerprint sensing element, a fourth fingerprint sensing element and a fifth fingerprint sensing element. In other embodiments of the disclosure, the quantity of the at least one fingerprint sensing element 122 may be one, two, three, four, six or more, which is not limited in the disclosure and may be determined by specific circumstances. In an embodiment of the disclosure, the fingerprint sensing circuit 121 is configured to perform a self-capacitance sensing on the at least one fingerprint sensing element 122 to implement the fingerprint sensing. In another embodiment of the disclosure, the fingerprint sensing circuit 121 is configured to perform a mutual-capacitance sensing on the at least one fingerprint sensing element 122 to implement the fingerprint sensing. The disclosure is not limited in this aspect and it may be determined by specific circumstances.

Preferably, in an embodiment of the disclosure, each fingerprint sensing element 122 includes at least one fingerprint sensing electrode capable of being capacitive-coupled to a finger of the user. In the case that there is a fingerprint input of the object in the fingerprint sensing region 11, the fingerprint sensing circuit 121 performs the self-capacitance sensing or the mutual-capacitance sensing on a capacitor formed by the at least one fingerprint sensing electrode and the object, and accordingly, the fingerprint input information input by the object in the fingerprint sensing region 11 is obtained. In a preferred embodiment of the disclosure, each fingerprint sensing element 122 includes a plurality of fingerprint sensing electrodes, and consequently, the capability of the fingerprint sensing element 122 in sensing fingerprint input information of the user is improved.

It should be noted that, the electronic device 1 provided according to the embodiments of the disclosure may be a display device or may not be a display device. If the electronic device 1 is the display device, the electronic device 1 may be a mobile phone or the like.

Figure 4:
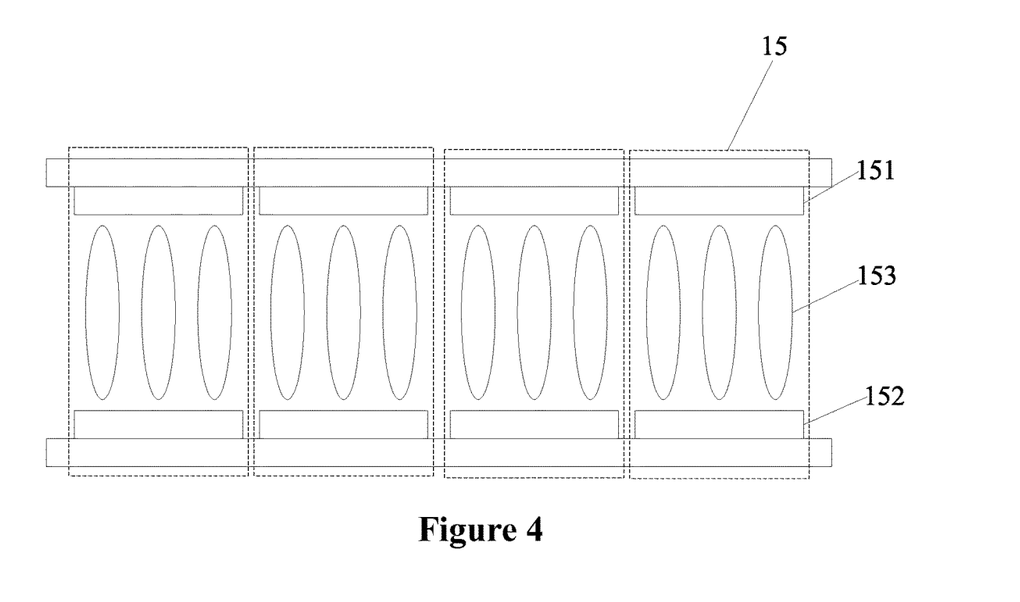
FIG. 4 is a schematic structural diagram of a display panel of an electronic device according to an embodiment of the disclosure.

In the case that the electronic device 1 is the display device, in an embodiment of the disclosure, the electronic device 1 further includes a display panel. As shown in FIG. 4, the display panel includes a plurality of display elements 15, and each display element includes a first electrode 151, a second electrode 152 and a display medium 153. The electronic device 1 supplies corresponding voltages to the first electrodes 151 and the second electrodes 152 to control the display media 153 to display a corresponding image. The display elements 15 define a display area.

In an embodiment of the disclosure, the display panel further includes a border area. The border area is opaque and is located on at least one side of the display area. The fingerprint sensing electrodes may be located in the border area or in the display area, which is not limited in the disclosure and may be determined by specific circumstances.

It should be noted that, in the case that the fingerprint sensing electrodes are located in the display area, the fingerprint sensing electrodes may be independent from the first electrodes 151, or a part of or all of the first electrodes 151 further serve as the fingerprint sensing electrodes, which is not limited in the disclosure and determined by the specific circumstances. In the case that the fingerprint sensing electrodes are independent from the first electrodes 151, other applications installed in the electronic device 1 in a video playing state may be called through the fingerprint sensing, while the calling of the other applications and the video playing may not interrupt each other.

In the case that the first electrodes 151 of a part of the display elements 15 further serve as the fingerprint sensing electrode, in an embodiment of the disclosure, the fingerprint sensing circuit 121 is configured to perform the self-capacitance sensing on the first electrodes 151 serving as the fingerprint sensing electrodes in the case that the electronic device 1 is in one of the N preset states, to perform the fingerprint sensing.

In the case that the first electrodes 151 of all of the display elements 15 further serve as the fingerprint sensing electrodes, the fingerprint sensing circuit 121 is configured to perform the self-capacitance sensing on the first electrodes 151 serving as the fingerprint sensing electrodes in the case that the electronic device 1 is in one of the N preset states, to perform the fingerprint sensing.

It should be noted that, in the case that a part of or all of the first electrodes 151 further serve as the fingerprint sensing electrodes, the N preset states do not include the video playing state. In the case that the N preset states do not include the video playing state, the first electrodes 151 merely serve as display electrodes, and applications can be not called through the fingerprint sensing. The applications may be called through the fingerprint sensing only if the current state of the electronic device 1 is one of the N preset states rather than the video playing state.

It should be further noted that, if the electronic device 1 is the display device, the display panel may be an in-plane switching (IPS) liquid crystal display panel or a fringe field switching (FFS) liquid crystal display panel, which is not limited in the disclosure as long as the first electrodes 151 are pixel electrodes and the second electrodes 152 are common electrodes.

It can be seen from the above description of the electronic device with the fingerprint sensing function that, for calling an application, corresponding valid fingerprint information may be input in the fingerprint sensing region if the electronic device is in one of the N preset states, and the application may be called based on the corresponding valid fingerprint information. It is not necessary to waken and unlock the electronic device, or to access a main page of the electronic device and touch an icon corresponding to the application. Therefore, the response speed of the electronic device in calling the application is enhanced.

In addition, with the electronic device with the fingerprint sensing function provided in the disclosure, when calling the application by using the fingerprint information, the application is called only if the input fingerprint information is valid, while the application is not called if the input fingerprint information is invalid. Therefore, the safety of the electronic device is improved.

Figure 5:
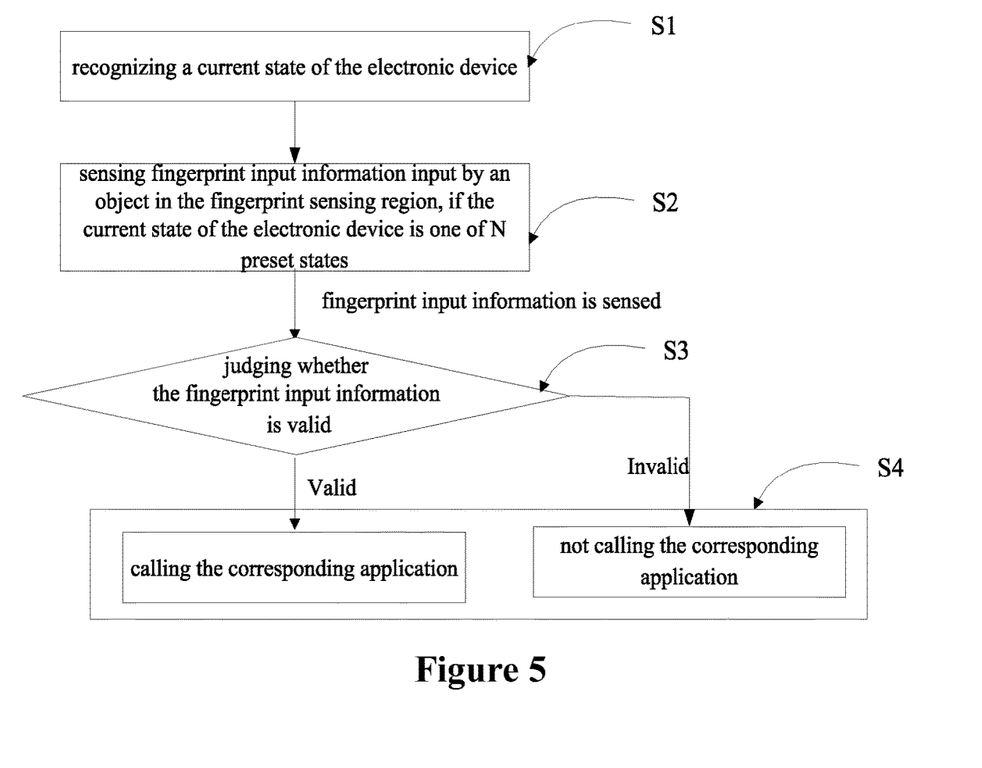
FIG. 5 is a flowchart of a method for calling an application in an electronic device according to an embodiment of the disclosure.

Accordingly, a method for calling an application in an electronic device with a fingerprint sensing function is provided according to an embodiment of the disclosure. The method is applied to the electronic device with the fingerprint sensing function according to any of the previous embodiments. The electronic device with the fingerprint sensing function includes a fingerprint sensing region. As shown in FIG. 5, the method includes following steps S1 to S4.

In the step S1, a current state of the electronic device is recognized.

In the step S2, fingerprint input information input by an object in the fingerprint sensing region is sensed in the case that the electronic device is in one of N preset states. Here N is a positive integer not less than 1. The object may be a finger, for example. The fingerprint input information in the fingerprint sensing region is not sensed in the case that the current state of the electronic device is not any one of the N preset states.

In the case that the current state of the electronic device is one of the N preset states, a self-capacitance sensing or a mutual-capacitance sensing is performed on capacitors within the fingerprint sensing region. It is judged whether there is a fingerprint input in the fingerprint sensing region, and corresponding fingerprint input information is generated if there is the fingerprint input in the fingerprint sensing region. In the embodiment of the disclosure, the N preset states include but are not limited to a screen-locked state and a standby state. The N preset states may include other states in other embodiments of the disclosure.

In the step S3, it is judged whether the fingerprint input information is valid.

It is judged whether the fingerprint input information is valid after the fingerprint input information in the fingerprint sensing region is obtained. It is determined whether the fingerprint input information matches pre-stored fingerprint information. It is judged that the fingerprint input information is valid if the fingerprint input information matches the pre-stored fingerprint information, or it is judged that the fingerprint input information is invalid if the fingerprint input information does not match the pre-stored fingerprint information.

In the step S4, after a judgment result is obtained, it is determined, based on the judgment result, whether to call a corresponding application. The corresponding application is called in the case that the fingerprint input information is valid, or no corresponding application is called in the case that the fingerprint input information is invalid. The application runs in a user mode, and interactions between the application and a user are available in the user mode. The application has a visible user interface, for example, the application may be a browser, a micro-blog, an e-reading application, a player, a game, a texting application, a keyboard and a contact list, etc.

In an embodiment of the disclosure, each application may be called by using one corresponding piece of valid fingerprint input information. In the case that the current state of the electronic device is one of the N preset states, the process of judging whether the fingerprint input information is valid includes: judging whether current fingerprint input information is valid. The process of determining, based on the judgment result, whether to call the corresponding application includes: calling the corresponding application if it is judged that the current fingerprint input information is valid, or not calling any corresponding application if it is judged that the current fingerprint input information is invalid.

According to an embodiment of the disclosure, different pieces of valid fingerprint input information input in a same fingerprint sensing region correspond to different applications. According to another embodiment of the disclosure, different fingerprint sensing regions correspond to different applications. It should be noted that, a same piece of valid fingerprint input information input in different fingerprint sensing regions may correspond to different applications; or different pieces of valid fingerprint input information respectively input in different fingerprint sensing regions correspond to different applications.

In other words, according to embodiments of the disclosure, each application corresponds to a certain piece of valid fingerprint input information input in a certain fingerprint sensing region.

In an embodiment of the disclosure, one application is called by using at least two pieces of valid fingerprint input information. In the embodiment, the process of judging whether the fingerprint input information is valid includes: judging whether at least two pieces of fingerprint input information successively sensed in one fingerprint sensing region each is predetermined valid fingerprint input information. In the embodiment, the process of determining, based on the judgment result, whether to call the corresponding application includes: calling the corresponding application if it is judged that the at least two pieces of fingerprint input information successively sensed in the same fingerprint sensing region each is predetermined valid fingerprint input information, otherwise, not calling the corresponding application.

In a particular embodiment of the disclosure, one application is called by using two pieces of valid fingerprint input information. It should be noted that in one case of the embodiment, for two permutations each including two pieces of valid fingerprint input information which are successively input, if the pieces of valid fingerprint input information in one permutation differ from those in the other permutation, the two permutations correspond to different applications, and if the pieces of valid fingerprint input information in one permutation and those in the other permutation are identical but an order for inputting the pieces of valid fingerprint input information in one permutation differs from that for inputting the pieces of valid fingerprint input information in the other permutation, the two permutations correspond to different applications. In other words, each application corresponds to a certain permutation of two pieces of valid fingerprint input information. In another case of the embodiment, if the pieces of valid fingerprint input information in one permutation differ from those in another permutation, the two permutations correspond to different applications. If the pieces of valid fingerprint input information in one permutation and those in another permutation are identical, the two permutations correspond to a same application, no matter whether orders for inputting the pieces of valid fingerprint input information in the two permutations are identical or not.

In other embodiments of the disclosure, one application may be called by using three, four or more pieces of valid fingerprint input information, which is not limited in the disclosure and may be determined by specific circumstances. Similarly, in the case that the pieces of valid fingerprint input information in one permutation and those in another permutation are identical but orders for inputting the pieces of valid fingerprint input information in the two permutations are non-identical, the two permutations may either correspond to a same application or correspond to different applications, which is not limited in the disclosure and may be determined by specific circumstances.

In an embodiment of the disclosure, the electronic device includes a plurality of fingerprint sensing regions. The process of judging whether the fingerprint input information is valid includes: judging whether all pieces of fingerprint input information sensed in at least two fingerprint sensing regions are valid. In the embodiment, the process of determining, based on the judgment result, whether to call the corresponding application includes: calling the corresponding application if it is judged that all pieces of fingerprint input information sensed in the at least two fingerprint sensing regions are valid, otherwise, not calling the corresponding application.

In a particular embodiment of the disclosure, the corresponding application is called in the case that two pieces of fingerprint input information respectively input in two fingerprint sensing regions 11 of the electronic device 1 are both valid. In one case of the embodiment, for two permutations, each including two pieces of valid fingerprint input information which are respectively input in two fingerprint sensing regions, if the pieces of valid fingerprint input information in one permutation and those in the other permutation are identical but the fingerprint sensing regions where one permutation is input and those where the other permutation is put are non-identical, the two permutations correspond to different applications. If the two fingerprint sensing regions where one permutation is input and those where the other permutation is put are identical but the pieces of valid fingerprint input information in one permutation and those in the other permutation are non-identical, the two permutations correspond to different applications. If the two fingerprint sensing regions where one permutation is input and those where the other permutation is put are identical, the pieces of valid fingerprint input information in one permutation and those in the other permutation are identical, but an order for inputting the pieces of valid fingerprint input information in one permutation differs from that for inputting the pieces of valid fingerprint input information in the other permutation, the two permutations correspond to different applications. In another case of the embodiment, if the two fingerprint sensing regions where one permutation is input and those where the other permutation is put are identical, the pieces of valid fingerprint input information in one permutation and those in the other permutation are identical, but an order for inputting the pieces of valid fingerprint input information in one permutation differs from that for inputting the pieces of valid fingerprint input information in the other permutation, the two permutations may correspond to a same application. According to other cases of the embodiment, if the pieces of valid fingerprint input information in one permutation and those in the other permutation are identical but the two fingerprint sensing regions where one permutation is input and those where the other permutation is put are non-identical, the two permutations may correspond to a same application, which is not limited in the disclosure and may be determined based on specific circumstances.

In an embodiment of the disclosure, the process of judging whether the fingerprint input information is valid includes: judging whether the fingerprint input information sensed within a predetermined period of time includes valid fingerprint input information. In the embodiment, the process of determining, based on the judgment result, whether to call the corresponding application includes: calling the application corresponding to the valid fingerprint input information sensed within the predetermined period of time if it is judged that the fingerprint input information sensed within the predetermined period of time includes the valid fingerprint input information, or not calling the corresponding application if it is judged that each piece of fingerprint input information sensed within the predetermined period of time is invalid.

It should be noted that, if one piece of valid fingerprint input information is sensed within the predetermined period of time, an application corresponding to the one piece of valid fingerprint input information is called. If two pieces of valid fingerprint input information are sensed within the predetermined period of time, an application corresponding to the two pieces of valid fingerprint input information is called. If three pieces of valid fingerprint input information are sensed within the predetermined period of time, an application corresponding to the three pieces of valid fingerprint input information is called. Similarly, if n pieces of valid fingerprint input information are sensed within the predetermined period of time, an application corresponding to the n pieces of valid fingerprint input information is called, here n is a positive integer more than 3. The disclosure is not limited in the aspect and it may be determined by specific circumstances.

Figure 6:
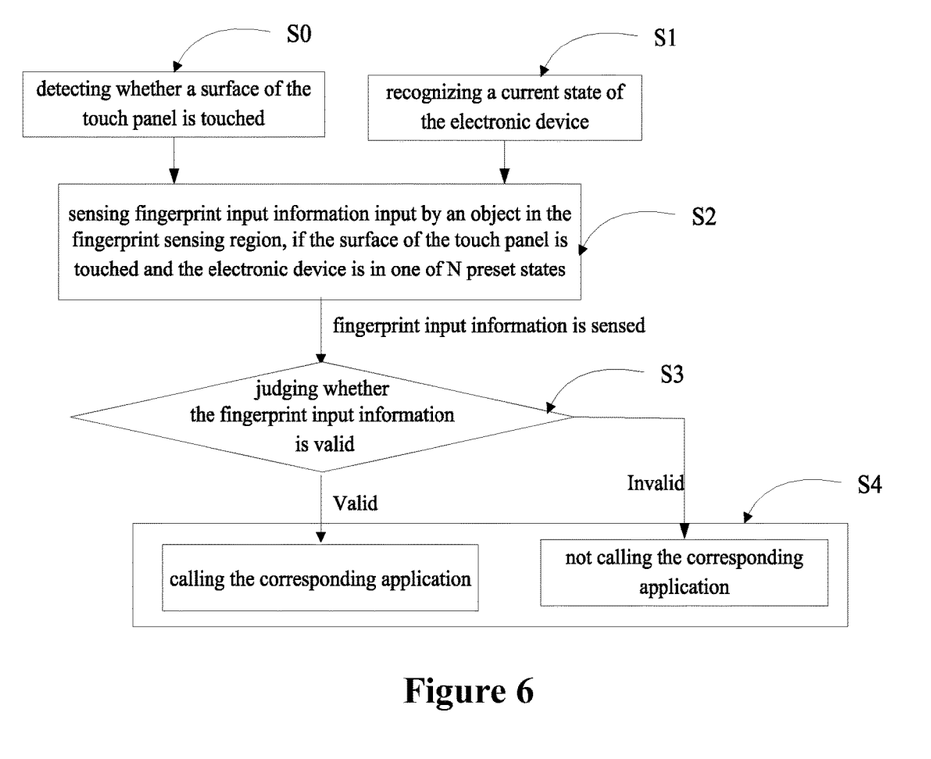
FIG. 6 is a flowchart of a method for calling an application in an electronic device according to an embodiment of the disclosure.

In an embodiment of the disclosure, the electronic device further includes a touch module. As shown in FIG. 6, the method further includes a step S0: detecting whether a surface of the touch panel is touched. The fingerprint input information input by the object in the fingerprint sensing region is sensed if it is detected that the surface of the touch panel is touched and the electronic device is in one of the N preset states.

In the embodiment, whether the surface of the touch panel is touched is detected in a real time manner or at a predetermined time interval. The fingerprint input information input by the object in the fingerprint sensing region is sensed in the case that the surface of the touch panel is touched and the current state of the electronic device is one of the N preset states. The fingerprint information in the fingerprint sensing region is not sensed in the case that the surface of the touch panel is not touched or the current state of the electronic device is not any one of the N preset states. Therefore, the power consumption of the electronic device is reduced.

In conclusion, with the electronic device with the fingerprint sensing function and the method for calling the application in the electronic device provided in the disclosure, for calling an application, corresponding valid fingerprint information may be input in the fingerprint sensing region if the electronic device is in one of the N preset states, and the application may be called based on the corresponding valid fingerprint information. It is not necessary to waken and unlock the electronic device, or to access a main page of the electronic device and touch an icon corresponding to the application. Therefore, the response speed of the electronic device in calling the application is enhanced.

In addition, with the electronic device with the fingerprint sensing function provided in the disclosure, when calling the application by using the fingerprint information, the application is called only if the input fingerprint information is valid, while the application is not called if the input fingerprint information is invalid. Therefore, the safety of the electronic device is improved.

Respective parts of the specification are described herein in a progressive manner. Each part is emphasized on differences from other parts, and same or similar contents of those parts may be referred to each other.

With the above description of the disclosed embodiments, those skilled in the art are enabled to implement or use the present disclosure. Numerous modifications to the embodiments are apparent to those skilled in the art, and the general principle herein can be implemented in other embodiments without deviation from the spirit or scope of the present disclosure. Therefore, the present disclosure is not limited to the embodiments described herein, but should be in accordance with the widest scope consistent with the principle and novel features disclosed herein.

The invention claimed is:

1. An electronic device with a fingerprint sensing function, comprising:
   a fingerprint sensing region;
   a fingerprint sensing component configured to sense fingerprint input information input by an object in the fingerprint sensing region;
   a processor and instructions stored in a memory, wherein the processor performs the instructions to:
   recognize a current state of the electronic device, provide a first driving signal to the fingerprint sensing component when the current state of the electronic device is in one of two preset states, to drive the fingerprint sensing component to sense a fingerprint,
   receive the fingerprint input information fed back by the fingerprint sensing component, judge whether the fingerprint input information is valid, and determine, based on a judgment result, whether to initiate a corresponding application; and
   wherein the fingerprint sensing component comprises a fingerprint sensing circuit and a fingerprint sensing element corresponding to the fingerprint sensing region, the fingerprint sensing element is connected to the fingerprint sensing circuit, wherein the fingerprint sensing circuit is configured to provide a fingerprint sensing signal to the fingerprint sensing element to drive the fingerprint sensing element to sense the fingerprint, and receive a sensing signal output by the fingerprint sensing element, and the fingerprint sensing circuit judges whether there is fingerprint input information based on the sensing signal and outputs the corresponding fingerprint input information to the control module if it is judged that there is the fingerprint input information;
   a display panel comprising a plurality of display elements each comprising a first electrode, a second electrode and a display medium, wherein the electronic device provides corresponding voltages to the first electrodes and the second electrodes to control the display medium to display a corresponding image, wherein the plurality of display elements form a display area, the display panel further comprising a border area, wherein the border area is opaque and is located on at least one side of the display area, and the fingerprint sensing region is located in the border area or in the display area; and wherein the fingerprint sensing element comprises a plurality of fingerprint sensing electrodes, and the fingerprint sensing circuit is configured to perform a self-capacitance sensing on the first electrodes serving as the fingerprint sensing electrodes to sense the fingerprint, in the case that the electronic device is in one of the two preset states.

2. The electronic device according to claim 1, wherein the corresponding application is initiated when it is judged that the fingerprint input information currently fed back by the fingerprint sensing component is valid, or the corresponding application is not initiated when it is judged that the fingerprint input information currently fed back by the fingerprint sensing component is invalid.

3. The electronic device according to claim 2, wherein different fingerprint sensing regions correspond to different applications.

4. The electronic device according to claim 2, wherein different pieces of valid fingerprint input information input in a same fingerprint sensing region correspond to different applications.

5. The electronic device according to claim 1, wherein the corresponding application is initiated when at least two pieces of fingerprint input information successively input in a same fingerprint sensing region each is predetermined valid fingerprint input information.

6. The electronic device according to claim 1, wherein the electronic device comprises a plurality of fingerprint sensing regions, and the corresponding application is initiated when pieces of fingerprint input information respectively input in at least two fingerprint sensing regions are valid.

7. The electronic device according to claim 1, wherein the first driving signal is provided to the fingerprint sensing component when the electronic device is in one of the two preset states, to drive the fingerprint sensing component to sense the fingerprint, receives the fingerprint input information obtained by the fingerprint sensing component, it is judged whether fingerprint input information received within a predetermined period of time is valid, and it is determined, based on a judgment result, whether to initiate the corresponding application.

8. The electronic device according to claim 7, wherein if it is judged that the fingerprint input information received within the predetermined period of time comprises valid fingerprint input information, the application corresponding to the valid fingerprint input information received within the predetermined period of time is initiated.

9. The electronic device according to claim 8, wherein the corresponding application is not initiated if it is judged that none of the fingerprint input information received within the predetermined period of time is valid.

10. The electronic device according to claim 1, further comprising a touch module, wherein the touch module comprises:

a touch panel; and a touch detection circuit, configured to, detect whether a surface of the touch panel is touched, and provide a second driving signal to the fingerprint sensing component when the touch detection circuit detects that the surface of the touch panel is touched;

the fingerprint sensing component receives the second driving signal, and senses, upon receiving both the first driving signal and the second driving signal, the fingerprint input information input by the object in the fingerprint sensing region.

11. The electronic device according to claim 1, wherein the display panel is an in-plane switching liquid crystal display panel or a fringe field switching liquid crystal display panel, the first electrodes are pixel electrodes, and the second electrodes are common electrodes.

12. A method for initiating an application in an electronic device with a fingerprint sensing function, the electronic device comprising a fingerprint sensing region, wherein the method comprises:

recognizing a current state of the electronic device, sensing fingerprint input information input by an object in the fingerprint sensing region when the current state of the electronic device is in one of two preset states; and judging whether the fingerprint input information is valid and determining, based on a judgment result, whether to initiate a corresponding application;

the electronic device comprising a fingerprint sensing component that includes a fingerprint sensing circuit and a fingerprint sensing element corresponding to the fingerprint sensing region, wherein the fingerprint sensing element is connected to the fingerprint sensing circuit, wherein the fingerprint sensing circuit is configured to provide a fingerprint sensing signal to the fingerprint sensing element to drive the fingerprint sensing element to sense the fingerprint, and receive a sensing signal output by the fingerprint sensing element, and the fingerprint sensing circuit judges whether there is fingerprint input information based on the sensing signal and outputs the corresponding fingerprint input information to the control module if it is judged that there is the fingerprint input information;

wherein a display panel comprises a plurality of display elements each comprising a first electrode, a second electrode and a display medium, and the electronic device provides corresponding voltages to the first electrodes and the second electrodes to control the display medium to display a corresponding image, wherein the plurality of display elements form a display area, the display panel further comprises a border area, the border area is opaque and is located on at least one side of the display area, and the fingerprint sensing region is located in the border area or in the display area; and the fingerprint sensing element comprises a plurality of fingerprint sensing electrodes, the first electrodes of a part of the display elements further serve as the fingerprint sensing electrodes, and the fingerprint sensing circuit is configured to perform a self-capacitance sensing on the first electrodes serving as the fingerprint sensing electrodes to sense the fingerprint, in the case that the electronic device is in one of the two preset states.

13. The method according to claim 12, wherein the process of judging whether the fingerprint input information is valid and determining, based on the judgment result, whether to initiate the corresponding application comprises:

judging whether current fingerprint input information is valid, and determining, based on a judgment result, whether to initiate the corresponding application.

14. The method according to claim 13, wherein the process of determining, based on the judgment result, whether to initiate the corresponding application comprising:

initiating the corresponding application if it is judged that the current fingerprint input information is valid, or not initiating the corresponding application if it is judged that the current fingerprint input information is invalid.

15. The method according to claim 14, wherein different pieces of valid fingerprint input information input in a same fingerprint sensing region correspond to different applications.

16. The method according to claim 14, wherein different fingerprint sensing regions correspond to different applications.

17. The method according to claim 12, wherein the corresponding application is initiated when at least two pieces of fingerprint input information successively sensed in a same fingerprint sensing region each is predetermined valid fingerprint input information.

18. The method according to claim 12, wherein the electronic device comprises a plurality of fingerprint sensing regions, and the corresponding application is initiated when pieces of fingerprint input information sensed respectively in at least two fingerprint sensing regions are valid.

19. The method according to claim 12, wherein the process of judging whether the fingerprint input information is valid and determining, based on the judgment result, whether to initiate the corresponding application comprises:

judging whether fingerprint input information sensed within a predetermined period of time comprises valid fingerprint input information, and determining, based on a judgment result, whether to initiate the corresponding application.

20. The method according to claim 19, wherein if it is judged that the fingerprint input information sensed within the predetermined period of time comprises the valid fingerprint input information, the application corresponding to the valid fingerprint input information sensed within the predetermined period of time is initiated.

21. The method according to claim 19, wherein the corresponding application is not initiated if it is judged that none of the fingerprint input information sensed within the predetermined period of time is valid.

22. The method according to any one of claim 12, wherein the electronic device further comprises a touch module, touch module comprises a touch panel, and the method further comprises:

detecting whether a surface of the touch panel is touched, and sensing the fingerprint input information input by the object in the fingerprint sensing region, if the surface of the touch panel is touched that is detected and the electronic device is in one of the two preset states.

* * * * *